(12) United States Patent
Makela et al.

(10) Patent No.: US 8,606,495 B2
(45) Date of Patent: Dec. 10, 2013

(54) METHOD AND APPARATUS FOR MINING VEHICLE SAFETY ARRANGEMENTS

(75) Inventors: Hannu Makela, Helsinki (FI); Jouni Sievila, Vantaa (FI); Jarkko Uotila, Tampere (FI)

(73) Assignee: Sandvik Mining and Construction Oy, Tahpere (FI)

( * ) Notice: Subject to any disclaimer, the term of this patent is extended or adjusted under 35 U.S.C. 154(b) by 0 days.

(21) Appl. No.: 13/696,766

(22) PCT Filed: May 6, 2011

(86) PCT No.: PCT/FI2011/050421
§ 371 (c)(1),
(2), (4) Date: Nov. 7, 2012

(87) PCT Pub. No.: WO2011/141629
PCT Pub. Date: Nov. 17, 2011

(65) Prior Publication Data
US 2013/0060458 A1    Mar. 7, 2013

(30) Foreign Application Priority Data

May 10, 2010   (FI) .................................. 20105505

(51) Int. Cl.
*G06F 17/10* (2006.01)
(52) U.S. Cl.
USPC ........... 701/301; 701/300; 701/408; 701/466; 701/467; 701/468; 340/435; 340/436; 340/988; 340/990; 180/167; 180/169; 180/339; 342/357.31; 342/455; 342/457; 318/587
(58) Field of Classification Search
USPC ......... 701/36, 2, 3, 23, 26, 50, 117, 120, 300, 701/301, 408, 466, 467, 468, 469, 532, 701/533; 700/245; 340/435, 436, 988, 990; 180/167, 169, 339; 342/357.31, 455, 342/457; 348/118, 119; 239/9, 267, 434.5; 405/302; 318/587; 37/314; 367/96; 184/6.12; 91/420
See application file for complete search history.

(56) References Cited

U.S. PATENT DOCUMENTS 5,949,366 A    9/1999  Herrmann
5,956,250 A *  9/1999  Gudat et al. .................... 701/26
(Continued)

FOREIGN PATENT DOCUMENTS

EP    2048516 A2    4/2009
EP    2177964 A2    4/2010
(Continued)

OTHER PUBLICATIONS

Linhui et al. Stereo Vision based Obstacle Avoidance Path-planning for Cross-country Intelligent Vehicle, 2009, IEEE, p. 463-467.*
(Continued)

*Primary Examiner* — McDieunel Marc
(74) *Attorney, Agent, or Firm* — Corinne R. Gorski, Esq.

(57) ABSTRACT

A method for a safety system of a mining vehicle. The method comprises scanning the surroundings of the mining vehicle while the mining vehicle is driven and giving a collision warning if an obstacle is detected in a safety zone of the mining vehicle. In the system, there is stored obstacle information comprising at least location information of predetermined obstacles. Location information of the obstacle detected on the basis of the scanning is compared with the location information determined in the obstacle information. Stopping of the mining vehicle, caused by the safety system due to the detected obstacle, is prevented in response to the detected obstacle being determined safe on the basis of checking the obstacle information.

20 Claims, 3 Drawing Sheets

(56) References Cited

U.S. PATENT DOCUMENTS

| | | | |
|---|---|---|---|
| 5,999,865 | A | 12/1999 | Bloomquist et al. |
| 6,246,932 | B1* | 6/2001 | Kageyama et al. ............ 701/24 |
| 6,633,800 | B1* | 10/2003 | Ward et al. ....................... 701/2 |
| 8,090,527 | B2* | 1/2012 | Muhlfelder ................... 701/416 |
| 8,294,568 | B2* | 10/2012 | Barrett .................... 340/539.11 |
| 2004/0158355 | A1* | 8/2004 | Holmqvist et al. .......... 700/245 |
| 2006/0265166 | A1 | 11/2006 | Maekelae |
| 2007/0027612 | A1 | 2/2007 | Barfoot |
| 2008/0088424 | A1 | 4/2008 | Imura et al. |
| 2009/0140852 | A1* | 6/2009 | Stolarczyk et al. ...... 340/539.13 |
| 2010/0063680 | A1 | 3/2010 | Tolstedt et al. |
| 2010/0099353 | A1* | 4/2010 | Komori ........................... 455/39 |
| 2010/0106356 | A1 | 4/2010 | Trepagnier |
| 2010/0109417 | A1* | 5/2010 | Jackson et al. ................. 299/1.4 |
| 2010/0127853 | A1* | 5/2010 | Hanson et al. ........... 340/539.13 |
| 2011/0118900 | A1* | 5/2011 | Uchida et al. .................... 701/2 |

FOREIGN PATENT DOCUMENTS

| | | |
|---|---|---|
| WO | 9109275 A2 | 6/1991 |
| WO | 2004085965 A1 | 10/2004 |
| WO | 2004086084 A1 | 10/2004 |

OTHER PUBLICATIONS

Banta et al., Mode-Based Navigation for Autonomous Mine Vehicles, 1992, IEEE, p. 181-185.*

Berglund et al., Planning Smooth and Obstacle-Avoiding B-Spline Paths for Autonomous Mining Vehicles, 2010, IEEE, p. 167-172.*

Dicketns et al., Pedestrian detection for underground mine vehicles using thermal images, 2011, IEEE, p. 1-6.*

* cited by examiner

METHOD AND APPARATUS FOR MINING VEHICLE SAFETY ARRANGEMENTS

RELATED APPLICATION DATA

This application is a §371 National Stage Application of PCT International Application No. PCT/FI2011/050421 filed May 6, 2011 claiming priority of Finnish Application No. 20105505, filed May 10, 2010.

FIELD OF THE INVENTION

The present invention relates to safety arrangements for mining vehicles.

BACKGROUND OF THE INVENTION

Various mining vehicles, such as rock drilling equipment, loading equipment and transport equipment, are used in a mine. Mining vehicles may be manned or unmanned. Unmanned mining vehicles may be remote-controlled from a control room, for instance, and they may be equipped with measuring instruments suitable for location determination. Unmanned mining vehicles may be driven automatically along a desired route in the mine, as long as the location of the device can be determined. The location of the device may be determined by using laser scanners, for instance.

Mining tunnels are usually narrow, and there is a risk that a mining vehicle hits a mine wall or obstacles along the route while travelling the route. It is known to equip an unmanned mining vehicle with a scanner and to monitor an area of a predetermined size in front of the mining vehicle. WO2004/086084 A1 discloses an apparatus in which at least one lateral safety zone is predetermined around a mining vehicle. In case an obstacle is detected on the basis of scanning in the safety zone determined for the mining vehicle, an alarm is given and the mining vehicle stops automatically.

BRIEF DESCRIPTION OF THE INVENTION

There is now provided an improved solution for safety arrangements of mining vehicles. The solution is characterised by what is stated in the independent claims. Some preferred embodiments of the invention are disclosed in the dependent claims.

According to an aspect of the invention there is provided a method, in which obstacle information comprising at least location information of predetermined obstacles is stored for controlling the safety system. Location information of an obstacle detected in the safety zone of the mining vehicle on the basis of scanning is compared with the location information determined in the obstacle information. Stopping of the mining vehicle, caused by the safety system due to a detected obstacle, is prevented in response to the detected obstacle being determined safe in the obstacle information.

According to another aspect of the invention, there is provided an apparatus that is arranged to compare location information of an obstacle detected in the safety zone of the mining vehicle on the basis of scanning with location information of obstacles determined in the predetermined obstacle information and to prevent stopping of the mining vehicle caused by the safety system due to the detected obstacle in response to said detected obstacle being determined safe in the obstacle information.

According to an aspect of the invention, there is provided a method, in which location information of an obstacle detected in the safety zone of the mining vehicle is determined in obstacle information to be part of a set of obstacles determined as safe in response to said obstacle being detected as safe. According to yet another aspect of the invention, there is provided an apparatus, which is arranged to determine location information of an obstacle detected in the safety zone of the mining vehicle in obstacle information to be part of a set of obstacles determined as safe in response to said obstacle being detected as safe.

According to an embodiment of the invention, a distance between the mining vehicle and an obstacle detected on the basis of scanning is determined, the distance is compared with a predetermined minimum distance, and location information of the obstacle is determined in response to the distance being shorter than the minimum distance.

The present invention provides several advantages, which will become apparent from the detailed description. Now it is possible to determine in driving route information obstacles that are detected as safe and will not induce a safety process leading to stoppage of the mining vehicle during automatic driving. Typically, the mining vehicle is driven back and forth along a once taught route, for instance, between a loading station and an unloading station, and now it is possible to avoid recurrent, unnecessary stops in situations where an obstacle is close to the mining vehicle, yet in such a manner that the mining vehicle can be steered past the obstacle.

BRIEF DESCRIPTION OF THE FIGURES

Some embodiments of the invention will now be described in greater detail by means of some preferred embodiments, with reference to the attached drawings, in which.

In the figures, features associated with the invention are shown in a simplified manner for the sake of clarity.

DETAILED DESCRIPTION OF AN EMBODIMENT OF THE INVENTION

The solution of the invention is suitable for use in safety systems particularly related to mobile mining machines necessary for mining, such as various mobile rock drilling rigs, loading and transport machinery. This type of mobile mining equipment is referred to as mining vehicles in the following. The scope of application of the invention is not restricted to the safety system of a mining vehicle to be illustrated below, but the features of the invention may also be applied to other types of safety systems for mining vehicles. It is also to be noted that a mining vehicle may generally refer to various rock excavation machines employed in a surface or underground operation area, i.e. the mining automation system may also be located at least partly somewhere else than in actual underground mines.

Figure 1:
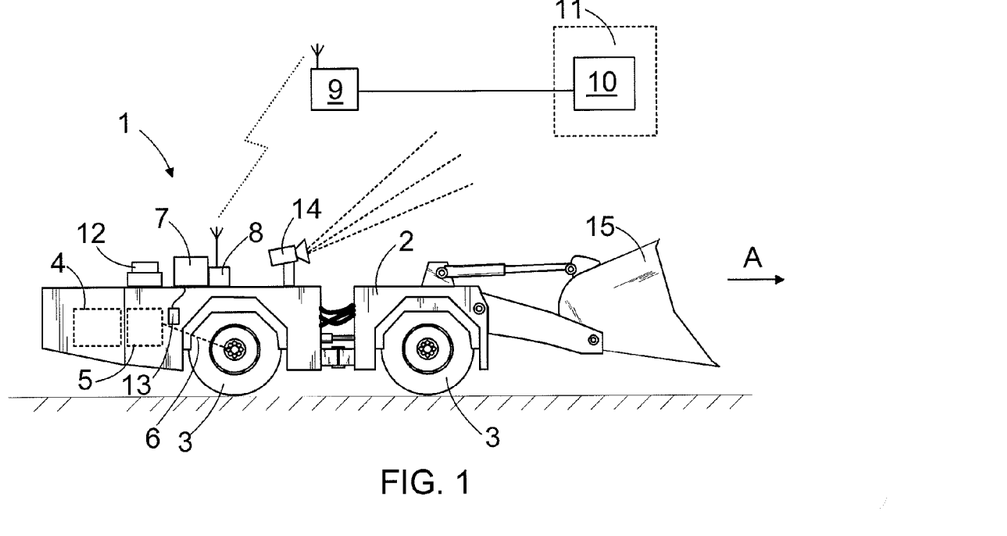
FIG. 1 is a schematic side view of a mining vehicle.

FIG. 1 shows an example of a mining vehicle 1, in this case loading equipment with a bucket 15 in front for transporting and loading excavated material. The mining vehicle 1 may alternatively be rock drilling equipment or transport equipment with a box, for example. The mining vehicle 1 comprises a movable carrier 2 with several wheels 3, of which at least one is a drive wheel that is driven by a motor 4 through transmission. The motor 4 may be an electric motor, combustion engine, hydraulic motor or any other device for providing rotation torque. Transmission usually comprises a gearbox 5 and required cardan shafts 6, differential gear and other power transmission members for transmitting the rotation torque from the motor 4 to the drive wheels. Unlike in the example of FIG. 1, the mining vehicle may alternatively be track-driven. The mining vehicle 1 is also equipped with a control system that includes at least a first control system 7 that is arranged to control actuators in the mining device 1 for controlling and driving the machine.

Further, the mining vehicle 1 may have a data transfer unit 8, with which the first control unit 7 may establish a data transmission connection to a second control system 10 external to the mining vehicle 1 by utilising a wireless connection provided by a base station 9. The second control system 10 may reside in a control room 11 that may be arranged outside the mine. The control systems 7 and 10 may be computers equipped with appropriate software.

FIG. 1 is a simplified figure, and the control system of a mining vehicle 1 typically comprises several units for implementing different control functions. The control system of the mining vehicle 1 may be a distributed entity consisting of modules connected to a CAN (Controller Area Network) bus, for example, and managing all measurements and controls of the machine. The information system of the control room 11 may also comprise one or more servers, databases, operator workstations and a connection to other networks and systems.

The control system of the mining vehicle 1 comprises a positioning system or unit. According to an embodiment, the positioning system comprises at least one gyroscope 12 that may be used to accurately determine the direction of the mining vehicle for positioning. The positioning system further comprises means for determining the distance the mining vehicle 1 has traveled. For instance, one or more sensors 13 may measure the rotation of a wheel 3. On the basis of the measurement data, the positioning system determines the rotational motion of the wheel and then calculates the distance the mining vehicle 1 has traveled. The positioning system may further comprise one or more scanners 14, such as a laser scanner or the like capable of determining the space and shapes surrounding the mining vehicle 1.

Figure 2:
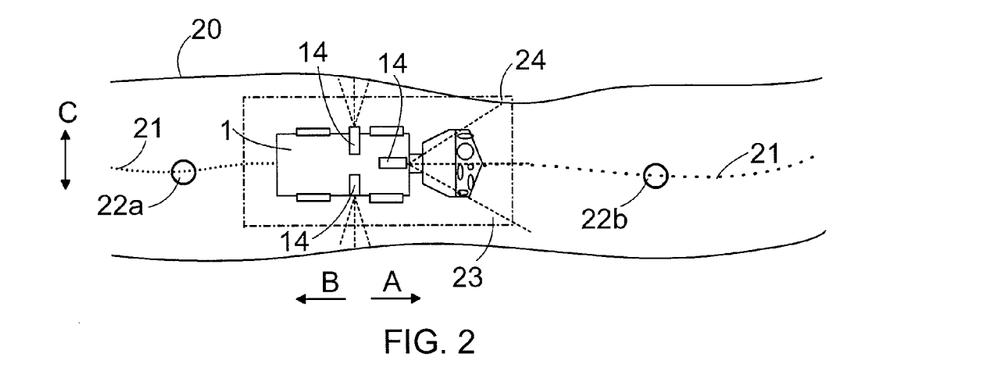
FIG. 2 is a top view of an arrangement for positioning and controlling a mining vehicle according to an embodiment.

FIG. 2 shows in accordance with an embodiment the principle of route determination and use of applied in positioning and based on scanning. A driving route 21 of the mining vehicle 1 may be created by teaching. In that case the mining vehicle 1 is driven in manual control along a desired route and on the basis of location data obtained by processing scanning data, route points 22a, 22b for the route 21 are determined and stored in memory at predetermined intervals. When the desired route 21 has been taught and stored in the memory of the control system, the mining vehicle 1 may be controlled to drive the route 21 autonomously. The location of the mining vehicle 1 may be determined during automatic control by using laser scanners 14, for instance. On the basis of the scanning data and a pre-stored environment model it is possible to determine the current location of the mining vehicle 1, and no separate identifiers, such as reflectors or radio-frequency identifiers, are needed on tunnel walls. The control system controls the travel of the mining vehicle on the basis of the determined location and the route point data of the driving route in such a manner that the mining vehicle 1 remains on the route 21.

The control system 7 of the mining vehicle 1 comprises a safety system, the purpose of which is to monitor that the vehicle does not collide with external obstacles. The system may utilize data received from one or more scanners 14 on the environment of the vehicle 1. According to an embodiment, at least one scanner 14 or a separate distance measuring device determines distances between the mining vehicle 1 and detected obstacles during driving. An obstacle refers here to any object, such as tunnel wall or loose rock, that may be relevant to the propagation of the mining vehicle 1.

For the mining vehicle 1 it is possible to determine at least one safety zone 23 for collision monitoring performed by the safety system. The safety zone illustrated in FIG. 2 is determined in the lateral direction C of the mining vehicle 1 and in its both directions of travel A, B. It should be noted, however, that the safety zone need not be determined in all these directions, but collision monitoring may be arranged, for instance, based only on data produced by one scanner directed in the direction of travel of the mining vehicle 1. The size of the safety zones in the direction of travel may vary in different directions A, B of the mining vehicle 1. The size of the safety zone may further be different in the lateral direction C than in the directions of travel A and B. The safety zone 23 may determine one or more minimum distances that shall remain between the mining vehicle 1 and the obstacle for safe propagation of the mining vehicle 1. It is also to be noted that, naturally, the safety zone formed by the minimum distances need not be rectangular in shape.

There may be several safety zones 23 and compared minimum distances. Safety monitoring may also include determination of (inner) edge distance that is defined in relation to the mining vehicle 1 and may depend on the specific dimensions of the mining vehicle 1, i.e., in practice, it depends on the external forms and structure of each particular machine 1. The use of edge distances may prevent false alarms caused by movements of the machine's 1 own structures, such as boom, bucket etc. The minimum distances, in turn, determine the locations of the outer edges of the safety zone 23. In dimensioning the minimum distances it is possible to consider, inter alia, dimensions of the mine tunnels, measurements and structure of the machine 1, driving speed, conditions and further security-related details. According to an embodiment, the minimum distances may vary from one driving route to another and/or in different sections of a driving route.

The control system of the mining vehicle 1 implements an algorithm performing collision monitoring. In case the control system detects that there is an external obstacle 24 in at least one of the safety zones 23 of the mining vehicle, the system gives a collision warning. The collision warning refers generally to a collision risk indication provided by the safety system. However, the collision warning may also refer to an impulse to carry out an (additional) safety check. On the basis of the collision warning, the mining vehicle 1 may at least in some cases be stopped immediately, and further, the control room 11 may be notified. Detection of an obstacle 24 appearing in the safety zone may be verified by a plurality of detections before a collision warning message is produced. Thus, it is possible to avoid false collision warnings.

Figure 3A:
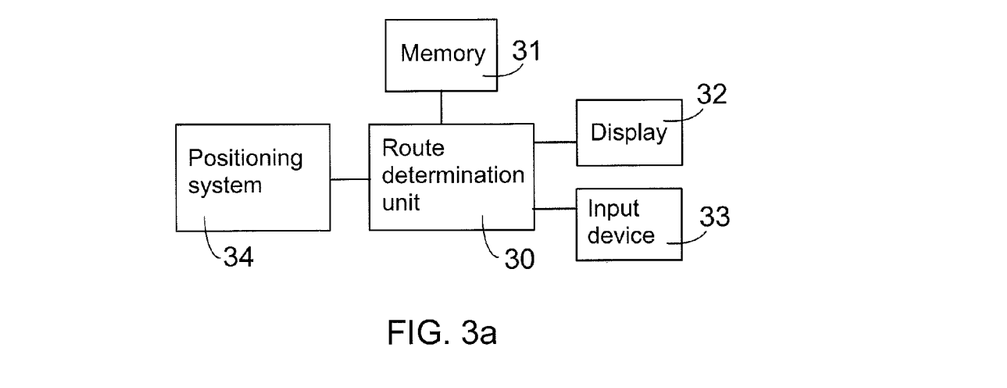
FIGS. 3a and 3b illustrate apparatuses according to some embodiments for determining driving routes of a mining vehicle.

FIG. 3a illustrates an apparatus of an embodiment for determining driving routes for a mining vehicle, for instance, for the mining vehicle 1 illustrated in FIG. 1. The apparatus comprises at least a unit 30 for determining driving routes and/or for associating data with the driving route, the unit being referred to below as a route determination unit. The route determination unit 30 is connected to a memory 31, in which various data used in the determination of a route, such as an environment model, driving route, specifics of the mining vehicle, and other data and parameters affecting route determination, may be stored. The route determination unit comprises a user interface for a display 32 and at least one user interface for at least one input means 33, such as a keyboard and/or mouse. The apparatus may also have one or more other interfaces to other systems. The apparatus typically comprises at least one data transmission unit that may utilise standard TCP/IP-based (Transport Control Protocol/Internet Protocol) network protocols, for instance.

The route determination unit 30 may be operationally connectable to a positioning system 34 that defines the location of the mining vehicle 1 during its drive. The positioning system 34 may be part of the mining vehicle 1, for instance, of the control system 7, and optionally, in part, also part of a navigation system implemented by the control system 10 outside the mining vehicle 1.

The route determination unit 30 may be implemented on an operator workstation, for instance. However, the route determination unit 30 need not be part of the data processing equipment used in controlling mining operation or even connectable thereto, which means that route determination is not fixed to a location or specific equipment. However, it should be noted that it is possible to implement at least some of the present technical features associated with determination of route-related information, such as the route determination unit 30, in the mining vehicle 1 and its data processing equipment. According to an embodiment, the route determination unit 30 is specifically arranged to determine supplementary control information on the basis of obstacles detected on the route in a manner illustrated in connection with FIG. 5. Obstacle information may be stored in the memory 31 and/or transmitted to other units, such as the control system 7 of the mining vehicle 1, so as to control the safety system.

Figure 3B:
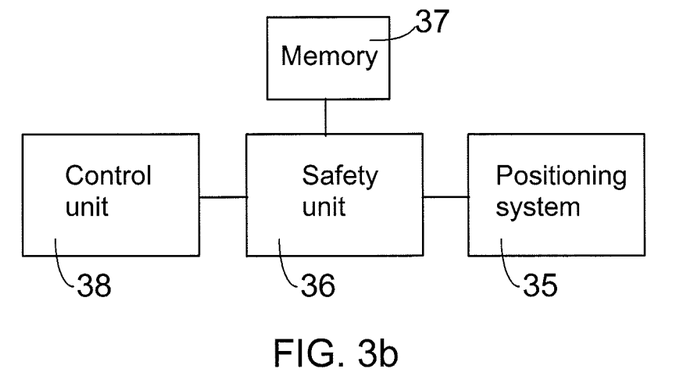

FIG. 3b illustrates operational units for the mining vehicle, for instance, for the control system 7 of the mining vehicle 1 in FIG. 1. A positioning system 35 takes care of determining the current location of the mining vehicle on the basis of the profile data received from the scanners 14 and the predetermined environment model, for instance. On the basis of the location information provided by the positioning system 35 and the driving route information stored in advance and/or received during driving, a control unit 38 controls the mining vehicle to drive along the determined route.

A safety unit 36 is connected to the positioning system 35, the memory 37 and the control unit 38. The safety unit 36 implements at least some of the operations of the mining vehicle safety system. The safety unit 36 may implement the algorithm performing the collision monitoring, taking care of at least the safety operations illustrated in connection with FIG. 4. The safety unit 36 may be arranged to determine distances to walls or other obstacles determined by the positioning system 35. Alternatively, calculation of distances is performed in some other unit, such as the positioning system, and the safety unit 36 receives information on an obstacle detected in the safety zone. The safety unit 36 may be arranged to also implement other safety operations, for instance, to stop the mining vehicle, when detecting that a person has entered the limited operating area via a passage gate.

The units 30, 36 shown in FIGS. 3a and 3b may be implemented, for instance, with one or more general-purpose processors of data processing equipment, in which one or more computer programs are executed. A computer program for controlling the processor implementing the operations of the unit 30 may comprise code for implementing at least some of the features related to the determination of obstacle information illustrated in FIG. 5. A computer program for controlling the processor implementing the operations of the unit 36 comprises code for implementing at least some of the features related to the utilisation of predetermined obstacle information illustrated below in connection with FIG. 4. The computer program may be stored on a machine-readable storage medium, such as the memory 31, 37 or a separate memory means, from which the computer program may be retrieved for execution on the processor.

A software application implementing the route determination unit 30 may be stored in a portable computer, for instance, from which route data including obstacle information may be transferred via a telecommunications connection or a memory means to the control unit 10 of the control room, for instance. The obstacle information may be further transferred from the control system of the control room to be used by the safety unit 36. Alternatively, the obstacle information may be transferred directly to the memory 37 utilised by the safety unit 36 of the mining vehicle 1.

Figure 4:
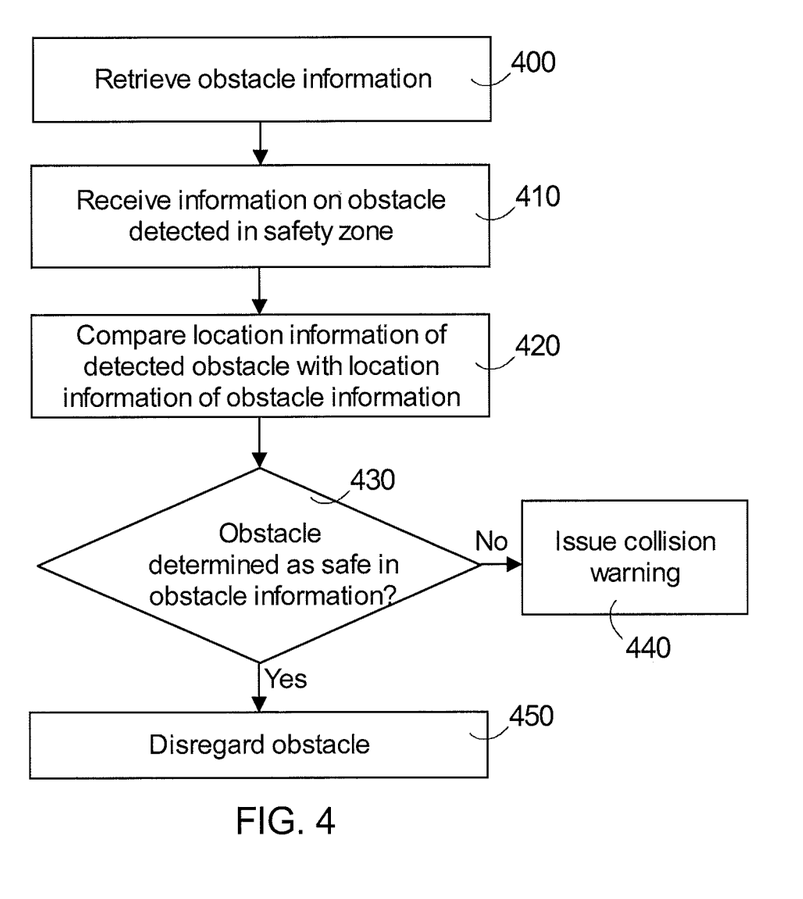
FIGS. 4 to 6 show methods according to some embodiments.

FIG. 4 shows a method according to an embodiment, which may be performed in the safety unit 36 illustrated in FIG. 3b, for instance. In the system, for instance, the memory 37, there is stored obstacle information that may comprise at least location information on obstacles determined as safe.

In the example of FIG. 4, the prestored obstacle information for controlling the safety system is retrieved or received in step 400, for instance, when the mining vehicle 1 starts driving autonomously on a predetermined driving route. The obstacle information may be read in advance in a RAM, so that the information need not be retrieved during driving from the file(s). It should be noted that, alternatively, the obstacle information could be retrieved from the memory or received during driving while performing safety monitoring, for instance, only when an obstacle has been detected.

In the system implementing the method of FIG. 4, such as the control system 7 of the mining vehicle 1, the surroundings of the mining vehicle 1 are scanned while driving the vehicle. In this context, scanning should be understood broadly to cover determination and/or reception of any type of information describing the current surroundings of a mining vehicle to determine distances, in particular. When an obstacle is detected in the safety zone 23 of the mining vehicle 1 on the basis of analysing scanning data, the algorithm illustrated in FIG. 4 receives an indication of this 410. In steps 420, 430, the location information of the detected obstacle is compared with the location information determined in the obstacle information.

A correspondence analysis between the detected obstacle and the obstacles determined in the obstacle information may be arranged in various ways on the basis of the location information. The location information may be compared in steps 420, 430, for instance, such that a distance r of the detected obstacle and a known obstacle determined in the location information is calculated on the basis of the location information. In case r is smaller than a predetermined threshold value for a known obstacle, such as 0.5 m, the detected obstacle is determined to correspond to said known obstacle. If the location information of the now detected obstacle is not stored in the obstacle information, a collision warning may be given in step 440 and/or additional control operations may be performed on the basis of the collision warning (in an embodiment, the algorithm of FIG. 4 may receive a collision warning already in step 410). The safety unit 36 may give a stop command to the control unit 38, which controls the mining vehicle 1 to stop. If the obstacle is determined safe in the obstacle information, the obstacle is disregarded. In this case, stopping of the mining vehicle in step 450, caused by the safety system due to an obstacle detected in the safety zone 23, e.g. one or more obstacles that are closer than the minimum distance, may be prevented in response to the location of said obstacle being sufficiently close to the location of an obstacle determined as safe.

Figure 5:
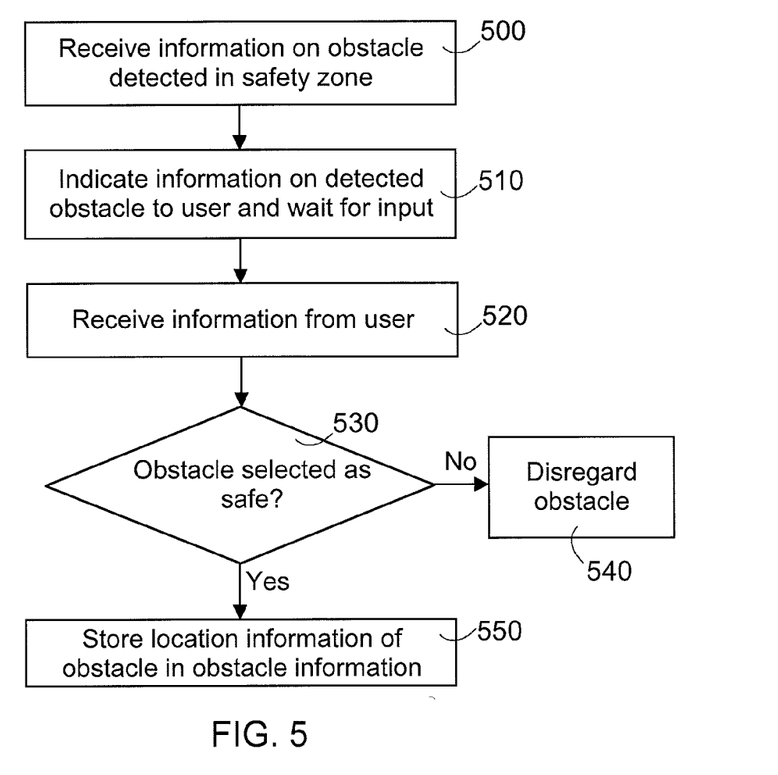

FIG. 5 shows a method for determining control information for a mining vehicle according to an embodiment, which may be performed in the route determination unit 30 illustrated in FIG. 3a, for instance.

The method illustrated in FIG. 5 may be applied while driving the mining vehicle 1 during determination and/or testing of a driving route. While driving the mining vehicle, the surroundings of the mining vehicle are scanned and it is determined whether the distance between the mining vehicle and the obstacle detected on the basis of scanning is smaller than the minimum distance.

When an obstacle is detected in the safety zone 23 of the mining vehicle 1, the algorithm illustrated in FIG. 5 receives an indication of this in step 500. In step 510, information on the detected obstacle is presented to the user and the process waits for a user input. In the case of an unmanned mining vehicle, for example, the obstacle may be shown to the user on a map formed on the basis of information on the mine surroundings or, for instance, as a picture on the display taken from the mining vehicle 1.

In step 530, the algorithm checks the input received from the user in step 520. If the obstacle is selected as safe on the basis of the user input, the obstacle is determined safe in the obstacle information. In step 550 the location information of the obstacle may then be stored with a selected accuracy in the obstacle information as part of the set of obstacles determined as safe. On the other hand, if the user has not selected the obstacle as safe or given an input, the obstacle may be disregarded in step 540 and the obstacle information is not stored as part of the set of obstacles determined as safe.

It should be understood that the embodiments shown above in connection with FIGS. 3a to 5 are only some examples of different ways to implement the present functionality. Some other and further embodiments are described below.

Figure 6:
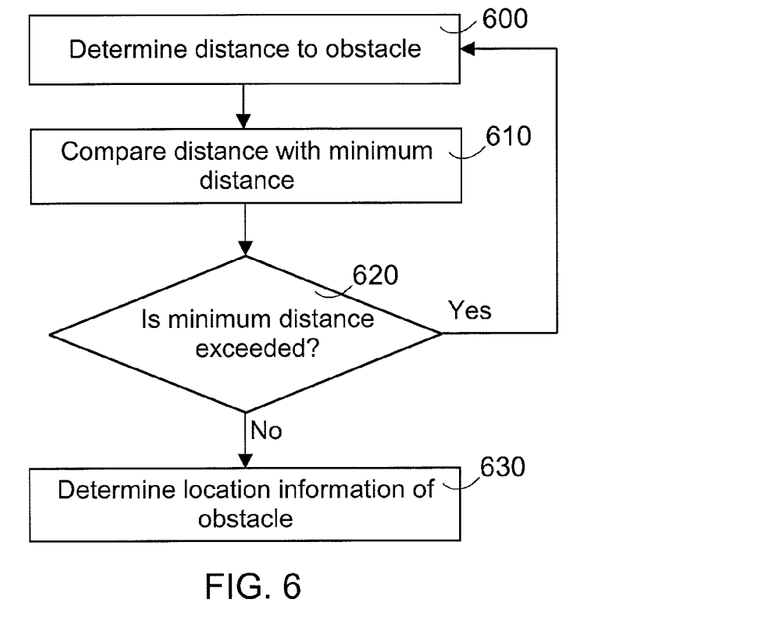

According to an embodiment, the location information of the obstacle is only determined if the obstacle is detected to reside within the safety zone. FIG. 6 shows a method of an embodiment, which may be used in connection with the methods illustrated in FIGS. 4 and 5. The distance of an obstacle detected, for instance, on the basis of scanning to the mining vehicle 1 is determined in step 600, and the determined distance is compared with at least one minimum distance in steps 610, 620. If the minimum distance is exceeded, the obstacle is outside the safety zone 23 and the method may return to estimate the next obstacle in step 600 (e.g. on the basis of the distance determined at regular intervals).

If the distance is smaller than the minimum distance, the obstacle is inside the safety zone 23, and the location information of the obstacle is determined in step 630. The location information may be determined, for instance, on the basis of the location of the mining vehicle at the moment of detection and the direction of the scanning beam. After step 630 or in connection therewith, the process may advance to step 410 of FIG. 4 or to step 500 of FIG. 5 or input the information on the detected obstacle and its location to a unit executing the process of FIG. 4 or 5. With this embodiment it is possible to reduce the amount of processing during driving. Estimation of obstacles is a naturally on-going process during the drive of the mining vehicle 1, wherefore it is also possible to return to step 600 after step 630. It is possible to select that scanner measurements are performed, for instance, 5 to 20 times per second in the area.

According to an alternative embodiment, location information of obstacles is determined during driving and may be compared with the location information of the obstacles determined in the obstacle information.

The location information of obstacles may define the x and y coordinates of the points in a certain standard coordinate system. According to an embodiment, a third dimension is also used, meaning that also the coordinate z may be defined.

According to an embodiment, the safety of an obstacle is determined instead of (or in addition to) a user selection at least partly automatically. For example, after step 500 a specific estimation algorithm is activated, which determines more accurate information on the detected obstacle and defines on the basis of additional checks whether the obstacle can be determined to be part of the set of obstacles detected as safe. Estimation may utilize information on the specifics of the mining vehicle, such as the reach range. The result of this estimation process may be presented to the user, who may finally confirm whether or not the obstacle is determined safe.

Obstacle information may be stored in connection with determination or testing of a route, for instance. A safety check for an obstacle may be performed, for instance, when the determined driving route is tested and in response to stopping of the mining vehicle caused by the safety system. Thus, functions illustrated in connection with FIG. 5 may be implemented by a testing unit that is possibly at least operationally separate from the route determination unit 30. By using the testing unit, taught driving routes may be tested on the basis of a test drive. The testing unit may comprise presently disclosed features for marking the obstacles. According to another embodiment, the route determination unit 30 provides a route determination tool, by which obstacles may be added and removed. The route determination unit 30 and the testing unit may be different tools of the same software or separate functionalities implemented by a single physical apparatus, for example.

According to an embodiment, a driving route may be tested in a computer-based manner by utilising simulation. A computer program implementing the test application may retrieve or determine the simulation model for the mining vehicle and the information on the driving route to be tested, i.e. the information on the route points of the driving route. The test application may be implemented by the route determination unit 30 as part of the route determination tool, for instance. The test application may run the computer model describing the mining vehicle on the route to be tested. Movement of the mining vehicle may be illustrated to the user on a mine map formed on the basis of the environment model or in other type of model describing the production area. The test application may also implement steps illustrated in connection with FIG. 5 for the obstacles detected on the basis of the simulation. The user may detect what kind of space remains around the vehicle in each part of the route. Alternatively, the program calculates the space remaining between the vehicle and the wall on the route and notifies the user of any points where the distance is smaller than the minimum distance. With this embodiment, time required for testing the route can be shortened, or the testing of the route may even be completely avoided by driving the mining vehicle 1. This kind of computer-based route testing may be used, for instance, when a return route for the already determined driving route is tested, and, in this case, the mining vehicle need no longer necessarily be separately driven in order to test the return route determined on the basis of the information on the driving route.

Obstacle information may be determined and stored in various ways, of which some examples are shown below. The obstacle information may include information on obstacles detected as safe and/or unsafe. For example, the obstacle information may comprise information on obstacles determined as unsafe, and, unlike in FIG. 4, a detected obstacle may be determined safe on the basis of checking this obstacle information. According to an embodiment, a list of obstacles separately determined as safe is stored, whereby it is possible to typically keep the amount of data to be compared during driving small. According to another embodiment, it is indicated in the obstacle information, for instance in a certain field, that the obstacle is determined safe.

According to an embodiment, the driving route may be defined by a plurality of independent segments, each comprising several route points. The information on the route points determined for the driving route may be stored as associated with a given identifier of the driving route and/or a segment. The segment-specific information may be pre-stored in the memory of the control equipment of the mining vehicle 1, whereby the route determination takes place at its simplest by sending only a list of identification codes of the route segments associated with the assignment. Segment-based route determination is described in more detail in publication WO2004/085965, which is incorporated herein by reference.

According to an embodiment, at least the location information of obstacles detected as safe is determined as part of a data element defining the entire driving route or a driving route segment, or in a file separate from the driving route file.

According to an embodiment, the obstacle information is also determined from one segment to another. Obstacle information may be determined 550 for each route segment in the route segment information or in a separate file. Thus, the safety unit 36 may compare 420 the information on the detected obstacles only with the obstacle information associated with the route segment in question.

According to an embodiment, the obstacle information is stored in an xml-based (extensible markup language) file, which may also comprise the driving route information, such as route point elements for each route point determined during the teaching of the driving route. However, it is to be noted that the obstacle information need not be stored in connection with the driving route information or in a file, but they may be entirely independent of the driving routes. Obstacle information may be stored in connection with an environment model describing the mine, for instance.

It will be obvious to a person skilled in the art that, as technology advances, the basic idea of the invention may be implemented in many different ways. The invention and its embodiments are thus not restricted to the examples described above, but may vary within the scope of the claims. Thus, different features may be left out, modified or replaced by equivalent features, and the features described in this patent application may be combined to form various combinations.

The invention claimed is:

1. A method for a safety system of a mining vehicle, comprising the steps of:
   scanning the surroundings of the mining vehicle with at least one scanner while the mining vehicle is being driven;
   storing obstacle information in a memory of the safety system, the obstacle information including a location of a predetermined obstacle in a path of the mining vehicle;
   detecting an obstacle in a safety zone of the mining vehicle from data received from the at least one scanner during scanning;
   detecting location information of the obstacle in the safety zone of the mining vehicle from the data received from the at least one scanner during scanning; and
   comparing the detected location information of the obstacle with the location information determined from the obstacle information by data processing means of the safety system, wherein stopping of the mining vehicle due to the detected obstacle is prevented in response to the detected obstacle being determined by the obstacle information to be safe for propagation of the mining vehicle.

2. A method as claimed in claim 1, further comprising the steps of determining the distance between the mining vehicle and the obstacle detected on the basis of the scanning comparing the distance with a predetermined minimum distance, and determining the location information of the obstacle in response to the distance being smaller than the predetermined minimum distance.

3. A method as claimed in claim 1, wherein the data processing means comprises a computer program including computer program code means executed in a computer for comparing the detected location information of the obstacle with the location information determined from the obstacle information.

4. A method for determining control information for a mining vehicle, comprising the steps of:
   scanning the surroundings of the mining vehicle by at least one scanner of a safety system while the mining vehicle is being driven; and
   detecting an obstacle in a safety zone of the mining vehicle from data received from the at least one scanner during scanning, wherein location information of said obstacle is determined by obstacle information stored in a data processing device to be part of a set of obstacles predetermined as safe in response to said obstacle being detected to be safe for propagation of the mining vehicle.

5. A method as claimed in claim 4, wherein said obstacle is detected as safe on the basis of an input received from the user.

6. A method as claimed in claim 4, wherein obstacles may be added and removed by means of a route determination tool.

7. A method as claimed in claim 4, wherein a safety check for the obstacle is performed when a determined driving route is tested and in response to stopping of the mining vehicle caused by the safety system.

8. A method as claimed in claim 4, wherein the location information of obstacles detected as safe is determined as part of a data element defining the entire driving route.

9. A method as claimed in claim 4, wherein the location information of obstacles detected as safe is determined as part of a driving route segment.

10. A method as claimed in claim 4, wherein the location information of obstacles detected as safe is determined as part of a driving route in a file separate from a driving route file.

11. An apparatus comprising:
    at least one data processing device for a safety system of a mining vehicle; and
    scanning means for detecting an obstacle in a safety zone of the mining vehicle, wherein the data processing device compares location information of the obstacle detected in the safety zone of the mining vehicle by the scanning means with location information of obstacles determined from predetermined obstacle information, to prevent stopping of the mining vehicle due to the detected obstacle in response to the detected obstacle being determined to be safe by the obstacle information for propagation of the mining vehicle.

12. An apparatus as claimed in claim 11, wherein the data processing device determines the distance between the mining vehicle and the obstacle detected by scanning, compares the distance with a predetermined minimum distance, and determines the location information of the obstacle in response to the distance being smaller than the minimum distance.

13. An apparatus comprising:
a data processing device for at least one safety system of a mining vehicle; and
scanning means for detecting an obstacle in a safety zone of the mining vehicle, wherein the data processing device determines location information of the obstacle detected by the scanning means in the safety zone of said mining vehicle from obstacle information to be part of a set of obstacles determined as safe in response to said obstacle being detected as safe for propagation of the mining vehicle.

14. An apparatus as claimed in claim 13, wherein said data processing device determines the obstacle to be safe from an input received from a user.

15. An apparatus as claimed in claim 14, wherein the data processing device provides the user with a route determination tool, by which obstacles may be added and removed.

16. An apparatus as claimed in claim 13, wherein the data processing device performs a safety check for the obstacle when a determined driving route is tested and in response to stopping of the mining vehicle caused by the safety system.

17. An apparatus as claimed in claim 13, wherein the data processing device determines the location information of obstacles detected to be safe as part of a data element defining the entire driving route.

18. An apparatus of claim 13, wherein the apparatus is a mining vehicle.

19. An apparatus as claimed in claim 13, wherein the data processing device determines the location information of obstacles detected to be safe as part of a data element defining a driving route segment.

20. An apparatus as claimed in claim 13, wherein the data processing device determines the location information of obstacles detected to be safe as part of a data element defined in a file separate from a driving route file.

* * * * *